(12) United States Patent
Lehmann et al.

(10) Patent No.: US 6,217,728 B1
(45) Date of Patent: Apr. 17, 2001

(54) ELECTROLYSIS CELL

(75) Inventors: Thomas Lehmann, Langenselbold; Patrik Stenner; Andreas Küver, both of Hanau, all of (DE)

(73) Assignee: Degussa-Huls AG, Frankfurt am Main (DE)

( * ) Notice: Subject to any disclaimer, the term of this patent is extended or adjusted under 35 U.S.C. 154(b) by 0 days.

(21) Appl. No.: 09/404,536

(22) Filed: Oct. 5, 1999

(30) Foreign Application Priority Data

Sep. 25, 1998 (DE) .............................. 198 44 059

(51) Int. Cl.[7] .............................. C25B 9/00; C25B 11/03; C25B 11/12
(52) U.S. Cl. .................... 204/265; 204/266; 204/283; 204/294
(58) Field of Search ..................... 204/257–258, 204/263–266, 294, 283

(56) References Cited

U.S. PATENT DOCUMENTS

| | | | |
|---|---|---|---|
| 3,969,201 | * 7/1976 | Oloman et al. | 204/222 X |
| 4,118,305 | * 10/1978 | Oloman et al. | 204/265 |
| 4,399,009 | 8/1983 | Chisholm . | |
| 4,615,783 | * 10/1986 | Staab | 204/266 X |
| 4,876,115 | 10/1989 | Raistrick . | |
| 5,972,195 | 10/1999 | Roberts et al. . | |

FOREIGN PATENT DOCUMENTS

| | | |
|---|---|---|
| 0 522 382 A1 | 1/1993 | (EP) . |
| 0 717 130 A1 | 6/1996 | (EP) . |
| 0 718 903 A1 | 6/1996 | (EP) . |
| 0 800 853 A2 | 10/1997 | (EP) . |
| 9101022 | 1/1993 | (NL) . |
| WO 92/15121 | 9/1992 | (WO) . |

OTHER PUBLICATIONS

Njau et al., "Reduction of Ferric Ions in Dilute Solution in a Semi-technical Scale GBC Reactor", J. of Applied Electrochemistry 28 (1998), pp. 343–349 (No month).

* cited by examiner

Primary Examiner—Donald R. Valentine
(74) Attorney, Agent, or Firm—Pillsbury Winthrop LLP

(57) ABSTRACT

An electrolysis cell for carrying out chemical reactions include an electrolyte chamber (2) with a fixed-bed electrode (2F), a gas chamber (1) filled with filling bodies (1F), a gas diffusion electrode with an ion-exchanging separator (3) applied on the electrolyte-chamber side. The ion-exchanging separator is applied onto the gas diffusion electrode by a method comprising a single or multiple application of a solution of an ion-exchanging material in a solvent onto the electrocatalytically active layer of the gas diffusion electrode and at least partial evaporation of the solvent after each coating. The electrolysis cell may be used for the oxidation and reduction of organic or inorganic components dissolved in the electrolyte.

7 Claims, 1 Drawing Sheet

ELECTROLYSIS CELL

CROSS-REFERENCE TO RELATED APPLICATION

This application is related to German Application DE 198 44 059.6, filed Sep. 25, 1998, which disclosure is incorporated herein by reference.

FIELD OF THE INVENTION

The invention relates to an electrolysis cell for carrying out chemical reactions. The electrolysis cell comprises an electrolyte chamber filled with electrically conductive filling material, a gas chamber and a gas diffusion electrode arranged between the electrolyte chamber and the gas chamber. The electrolysis cell may be used for the oxidation or reduction of components dissolved in the electrolyte, especially for converting cystine or cystine derivatives into cysteine or cysteine derivatives.

BACKGROUND OF THE INVENTION

Chemical reactions, especially oxidations and reductions, in an electrolysis cell using a gas diffusion electrode, are known. Thus, NL-A 9101022 teaches an electrolysis cell which comprises a gas chamber, an electrolyte chamber and a gas diffusion electrode arranged between them and having an electrolyte chamber filled with electrically conductive filling bodies acting as a fixed-bed electrode. The gas diffusion electrode to be used, which has a customary design, is in direct contact with the electrolyte chamber. Using an acidic electrolyte and a hydrogen-consuming anode, an Fe(III) salt dissolved in the electrolyte can be reduced to the corresponding Fe(II) salt. Inorganic and organic compounds can be oxidized in an analogous manner using an oxygen-consuming cathode, e.g., Fe(II) salts to Fe(III) salts or glucose to gluconic acid. The conversion is significantly increased by the fixed-bed electrode in the electrolyte chamber in comparison to using a customary a real electrode. Various influencing factors such as the particle size of the fixed bed and the electrolyte concentration, are described in J. Appl. Electrochemistry 28 (1998) 343–349. A disadvantage of this electrolysis cell resides in the fact that contact breaks occur on account of the rigidity of the gas diffusion electrode (GDE) resting on a rigid support grid and on account of the motion caused by the flow of the electrolyte, which contact breaks reduce the efficiency. A further disadvantage resides in the fact that the distribution of moisture between the gas chamber and the electrolyte chamber is problematic and flooding of the pores of the gas diffusion electrode on the side of the gas chamber hinders the passage of the gas to the catalytically active layer so that a higher operating voltage results and/or the electrolysis process comes to a halt. Finally, phenomena of poisoning readily occur as a result of the direct contact of the electrolyte, with compounds contained therein to be reduced or oxidized, with the catalytically active layer of the gas diffusion electrode, which brings about a drop in performance and a short service life of the GDE.

The problem of the passage of liquid through a gas diffusion electrode, which is caused by the hydraulic pressure of the electrolyte, is solved in the electrochemical cell according to EP-A 0,717,130, which comprises two electrolyte chambers separated by an ion exchange membrane but does not comprise a fixed-bed electrode, by forming the gas chamber in the form of gas pockets superimposed on each other in a cascade, which gas pockets are separated from each other and open downward toward the electrode. However, this design is technically expensive and also does not solve the problem of poisoning of the catalytic layer of the GDE.

The problem of the deactivation of the catalytic layer of the GDE in an electrolysis cell comprising two electrolyte chambers and a GDE along with a gas chamber can be avoided according to EP-A 0,522,382 by using a cation exchange membrane brought into direct contact with the catalytic layer of the $H_2$-consuming GDE. In the cell described therein, the membrane is pressed on the GDE only by the pressure of the electrolyte and/or by a resilient element in the electrolyte chamber bordering on the GDE. Cells are also known having a gas diffusion electrode that comprises an ion exchange membrane laminated under pressure and temperature on the catalytic layer—see, e.g., U.S. Pat. No. 4,399,009. In both documents cited, no fixed-bed electrode is used. As the inventors of the present application determined using a cell comprising a fixed-bed electrode and an $H_2$-consuming gas diffusion anode with an ion exchange membrane pressed on the electrolyte side, a delamination of the ion exchange membrane readily occurs given the customary design of the gas chamber behind the GDE, which leads to contact breaks and a reduction of the current gain or current efficiency.

EP-A 0,800 853 teaches a method and an electrolysis cell for cleaning gases, which cell comprises a fixed-bed electrode and a gas diffusion electrode (GDE) separated from it by a separator. The contacting of the GDE takes place via several contact strips of a noble metal or valve metal such as tantalum arranged on the electrode. Another contacting possibility suggested is to fill the gas chamber with graphite spheres in order that the electrode is contacted uniformly over the surface; the electric connection then takes place by means of an electrode end plate connected to the graphite spheres. It was determined that significant operational disturbances and a reduction of the current gain occur in continuous operation of the gas cleaning described in this document, during which the electrolyte and the gas are conducted in countercurrent manner through the catholyte chamber, as a consequence of the occurrence of delamination of an ion exchange membrane thermally pressed in a customary manner onto the catalytic layer of the GDE.

U.S. Pat. No. 4,876,115 teaches a fuel cell comprising two gas diffusion electrodes and a membrane of a solid polymeric electrolyte arranged between them. The production of the cell comprises, in order to form the membrane, the spraying of a solution of the membrane material such as NAFION® (E. I. Dupont and Company) onto the catalytic side of a gas diffusion electrode and the removal of the solvent. The cell does not comprise an electrolyte chamber provided with a fixed-bed electrode.

According to U.S. Pat. No. 5,106,433 the electroreduction of cystine and derivatives takes place in the presence of a nitrogen-containing base such as ammonia using a cell comprising two electrolyte chambers with a cathode having a high surface area, e.g., a carbon fleece. The expense for the recovery of the N-containing base is a disadvantage. A further disadvantage is the requirement for two electrolyte circuits. N-acetylcysteine is produced from L-cystine in the method of WO 97/42358 in which according to one embodiment a reaction mixture which can be obtained by the acetylization of cystine, contains N-acetylcystine that has been adjusted to a pH of 6 to 7 and that is electroreduced and, at the same time, desalinated electrodialytically. The electrolysis cell to be used in this instance can comprise a graphite cathode and a hydrogen-consuming gas diffusion anode and contains an ion exchange membrane between the electrolyte chambers. A Na-acetate solution is used as anolyte and the reaction mixture contains N-acetylcystine, Na-acetate and NaCl as catholyte. The economy of this method is inadequate for present requirements. According to the known method using an electrolysis cell comprising two electrolyte circuits and a cation exchange membrane arranged between them and using an alkaline anolyte, the catholyte is enriched with Na ions, which results in an increased expense for desalination of the solution during isolation of the product after the conclusion of the electrochemical conversion.

SUMMARY OF THE INVENTION

The invention therefore has the object of providing an electrolysis cell with a fixed-bed electrode in the electrolyte chamber, with a gas chamber and with a gas diffusion electrode arranged between them during the use of which said problems occur to a reduced extent or are preferably totally eliminated.

The electrolysis cell should be suitable in particular for the reductive splitting of organic compounds with a disulfide bridge, in particular for the production of L-cysteine and its derivatives from L-cystine and its derivatives and should avoid disadvantages of previously known electrolytic methods.

An electrolysis cell for carrying out chemical reactions is provided, that comprises an electrolyte chamber filled with electrically conductive filling material, such as filling bodies, for receiving a liquid electrolyte, a gas chamber filled with electrically conductive filling material, such as filling bodies, for receiving a gas to be oxidized or reduced, a gas diffusion electrode arranged between the gas chamber and the electrolyte chamber, which gas diffusion electrode is connected on the electrolyte-chamber side to an ion-exchanging separator, current collectors (contacting elements) for the gas diffusion electrode and the filling material which functions as a counterelectrode in the electrolyte chamber, and devices for supplying and removing the electrolyte and the gas. The electrolysis cell is characterized in that the ion-exchanging separator is applied in a layer onto the gas diffusion electrode by a method comprising a single application or multiple applications of a solution of an ion-exchanging material in a solvent onto the electro catalytically active layer of the gas diffusion electrode, and evaporating the solvent.

According to a preferred embodiment the electrolysis cell contains a known hydrogen-consuming gas diffusion anode (GD anode) as the gas diffusion electrode. Such a GD anode is used for the purpose of cathodic reduction of organic or inorganic compounds; In this instance the ion-exchanging layer is a cation exchange layer. An electrolysis cell with an oxygen-consuming cathode, an anion exchange layer and a fixed-bed anode is used in an analogous manner for the purpose of oxidation of a compound.

A gas diffusion electrode (GDE) normally comprises a pore-formed, flexible, electrocatalytic layer and a pore-formed current collector with a plurality of contact points. The GDE is designed to be hydrophobic on the gas side and hydrophilic on the electrolyte side. The catalytic layer is usually based on activated carbon or conductive carbon black and at least one noble metal in conjunction with polytetrafluoroethylene. Fleeces of pyrolyzed carbon and/or nets or grids of platinum or a platinum alloy usually serve as the current collector. Details of the construction of gas diffusion electrodes can be obtained from the literature— see, e.g., C. H Hamann, W. Vielstich, Elektrochemie [German—Electrochemistry], 3d edition, 1998, Wiley VCH, 478. Gas diffusion electrodes are also commercially available.

It has been found that, by filling the gas chamber with filling material particles of a conductive material, current breaks and reductions of output such as those occurring in conventional cells can be avoided. A self-regulating and contact-preserving action is achieved by the anodic fixed bed. It is assumed that movements in the cathodic fixed bed are compensated by movements in the anodic fixed bed. Such a compensation is possible if the GDE is arranged in a sufficiently flexible manner and can transfer movement impulses from one said chamber to the other. In addition to an optionally present fine metallic net on the hydrophobic side of the GDE, the current collector of the GDE comprises the anodic fixed bed and a rigid metallic current collector which limits or extends into the fixed bed. This current collector is preferably designed in the form of a metallic net or a metal plate defining the fixed bed. Formed particles of a corrosion-resistant metal, metal alloy or a combination of metals or a carbon-containing material, especially graphite, can be used as filling material. The particles are advantageously spherical with a diameter in the range of 0.5 to 5 mm. The fixed bed, functioning in the electrolyte chamber as a working electrode, comprises a bed of particles of a conductive material with a corrosion resistance sufficient for the electrolyte such as, in particular, graphite in any form, e.g., a spherical, saddle, ring or rod shape. The shape of the particles is selected so that the electrolyte can flow without problems through the intermediate spaces of the fixed bed. The highest possible volume-specific surface of the filling material along with the smallest possible pressure loss is desired. The fixed bed in the electrolyte chamber and the gas chamber advantageously consists of particles of the same material and preferably particles with the same or similar shape.

The contacting of the fixed-bed electrode takes place by means of one or several conductive and corrosion-resistant contacting rods such as graphite or titanium extending into the fixed bed or by means of one or more contact grids or plates of a corrosion-resistant material which is a good conductor, e.g., a valve metal such as titanium or tantalum arranged in the fixed bed or on its wall.

An essential feature of the invention is the design of the ion exchange layer in accordance with the invention. Whereas if an ion exchange membrane is used the current rapidly drops with the operating time given a constant voltage, with the design in accordance with the invention the current remains essentially constant since the layer neither flutters nor delaminates but rather assures an intensive and permanent contact with the gas diffusion electrode. This effect can be clearly recognized by a comparison of the Examples with the comparative Examples, below.

The production of the ion-exchanging layer on the catalytic layer of the GDE can take place by a one-stage or multi-stage layering. For the layering, a solution of a film-forming, polymeric ion exchange material in a suitable solvent or solvent mixture is applied with customary layering or coating techniques, e.g., by pouring, brushing or applying with a doctor blade. An intermediate drying, with solvent evaporation, is carried out at least partially after each coating application with total drying at the end. Care is needed especially during the application of the first layer that the solution does not penetrate too deeply into the catalytic layer. To the extent that the catalytic layer itself still contains solvent from the production, the drying of the catalytic layer can take place together with the ion exchange layer.

Customary organic cation and anion exchange materials can be used insofar as their chemical stability is assured in the electrolysis cell under the operating conditions and the polymer in the solvent has a solubility sufficient for coating purposes. Fluoropolymers and fluorocopolymers containing a sulfonic-acid group such as copolymers of tetrafluoroethylene with $CF_2=CF—O—CF_2—CF_2—SO_3H$ or other fluorine-containing, polymerizable compounds with sulfonic-acid groups, phosphonic-acid groups or carboxyl groups can be used for cation exchange layers. Such cation exchange materials are commercially available (e.g., NAFION® by DuPont and FLEMION® by Asahi Glass). Even solutions, e.g., NAFION® in alcohol, are commercially available. The copolymers can also be products which are based on a polymerizable acid such as acrylic acid, maleic acid, fumaric acid or maleic-acid anhydride with styrene and/or divinylbenzene and/or trifluoroethylene or tetrafluoroethylene. Potential materials for the production of anion-exchanging layers are systems which form the basis for commercial anion-exchange membranes. One skilled in the art will be able to determine the suitability of the material under the conditions of the electrolysis by orienting experiments.

The coating of the GDE with a polymeric ion-exchange film yields flexible systems exhibiting a low electric resistance. The layer thickness can be adapted to the desired system. In general, a layer 10 to 50 μm thick is sufficient, in contrast to which commercial membranes are usually considerably thicker. Delamination during operation is reliably avoided by the layer.

According to a further embodiment a very thin ion-exchange membrane can be additionally placed on the very thin layer which is in accordance with the invention. In this instance the layer acts as an adhesive base for the membrane so that delamination during operation is avoided. According to a further embodiment the dissolved ion-exchange material can also be used during the production of the catalytically active catalytic layer on the basis of, e.g., platinum/activated carbon or carbon black/TEFLON®. It is possible, by using a very small amount of the ion-exchanging material, to keep the pores in the catalyst open yet at the same time to create an efficient adhesive base for a membrane.

The electrolyte chamber can be designed as a simple flow through cell or in such a manner that the fixed bed can be operated as a trickle-bed reactor and a gas containing an electrochemically oxidizable or reducible component is conducted counter to the electrolyte trickling over the trickle bed. This embodiment is suitable for the cleaning of gases (cf. EP-A 0,800,853). Previously customary problems with delamination of the exchange membrane no longer occur— see Example 3 and Comparative Example 2.

The cell in accordance with the invention can be used for the oxidation or reduction of organic and inorganic substances dissolved in the electrolyte. Thus, compounds with a disulfide bridge, especially L- and DL-cystine and derivatives such as NN'-diacetylcystine can readily be converted by electroreduction into the corresponding mercapto compounds, in the case of cystine into cysteine. As has already been explained, the electrolysis cell is also suitable for the cleaning of gas if an electrolyte and a gas to be cleaned are supplied to the electrolyte chamber countercurrently.

DETAILED DESCRIPTION OF THE PREFERRED EMBODIMENTS

Figure 1:
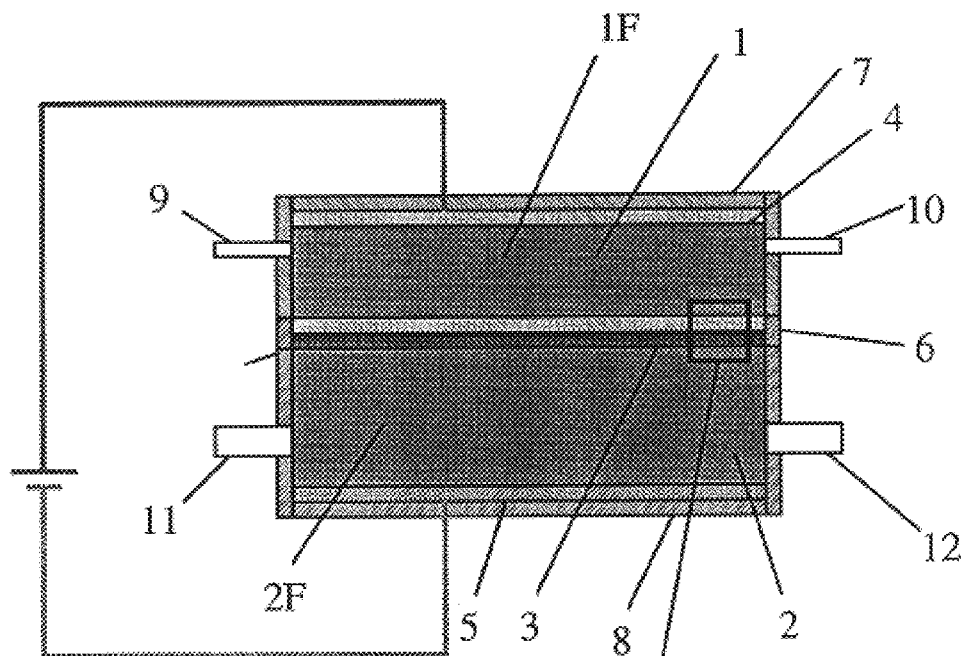
FIG. 1 illustrates, schematically, a cross-sectional view of a preferred electrolysis cell.
Figure 2:
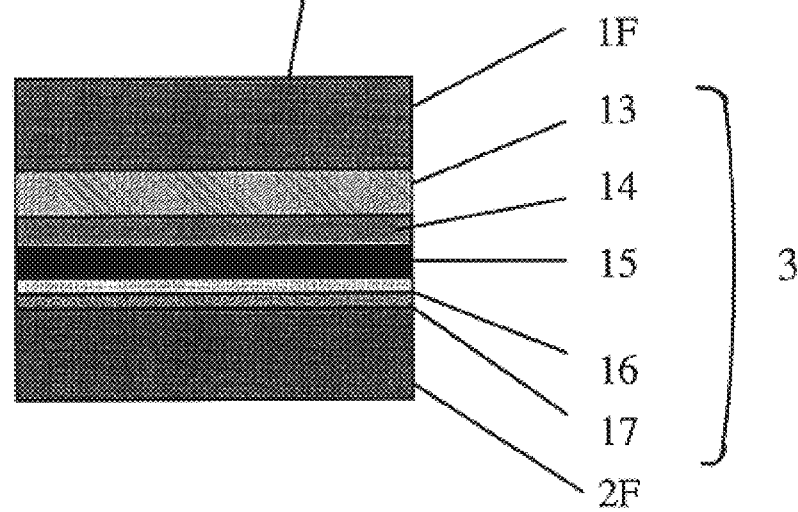
FIG. 2 illustrates an enlarged detail thereof.

FIG. 1 illustrates an electrolysis cell of the invention that includes gas chamber 1 formed by anode frame 7 and separating element 3 comprising the gas diffusion electrode and ion exchanger with fixed bed 1F arranged in gas chamber 1. The cell further comprises electrolyte chamber 2 formed by cathode frame 8 and separating element 3 which chamber 2 contains fixed bed 2F. Frame parts 7, 8 are connected to one another by seal 6 in a liquid-tight and electrically insulating manner. Frame 7 contains connections 9, 10 for supplying and removing the gas; frame 8 analogously contains connections 11, 12 for supplying and removing the electrolyte. Metal net 4 on the rear wall of the anolyte chamber serves for contacting fixed bed 1F. Metal plate 5 on the rear wall of the catholyte chamber serves for contacting fixed bed 2F. The cables connected to these contacting elements run to the voltage source. The detail shown in FIG. 2 illustrates separating element 3 and adjacent fixed beds 1F, 2F. Separating element 3 consists of fine net 13 serving to delimit porous and hydrophobic carbon fleece 14 of the GDE, which fleece is bound by TEFLON®; catalytic layer 15 of the GDE, built up, e.g., from activated carbon or carbon black, TEFLON® and platinum, is located on the fleece. Ion-exchange layer 16 applied by coating onto catalytic layer 15 is located between catalytic layer 15 and ion-exchange membrane 17.

The ion-exchange layer preferred according to the invention permits the construction of cells with a long service life since the separating element consisting of the GDE and ion-exchange layer, in addition to an optionally present fine net which is on the gas-chamber side and in addition to a membrane additionally applied onto the ion-exchange layer on the electrolyte-chamber side. this makes possible good contact with the fixed beds in the gas chamber and the electrolyte chamber. The separating layer is sufficiently flexible and self-regulating and therefore preserves the contact. The design of the gas chamber is simple since the formation of conduits in the frame is eliminated. Reliable protection of the catalytic layer is assured by the ion-exchange layer and delamination, like that which often occurs in previously known cells after a short operating time and results in operational interruptions, does not occur. Finally, the design in accordance with the invention results in a slight voltage drop and thereby results in greater economy.

A problem which occurs especially in the electroreduction of cystine and cystine derivatives in cells which are not in accordance with the invention and which have an ion-exchange membrane of the GDE is diffusion of the amino acid through the membrane and crystallization on its back side. This is eliminated by using a cell with an ion-exchange layer in accordance with the invention on the GDE—see Examples 1,2 and Comparative Example 1. Further advantages are:

- elimination of the anolyte circuit and therewith a simplification of the cell and of the method;
- saving of energy by lowering the cell voltage; and
- better control of the ion budget by the electrochemical formation of protons and their charging into the alkaline catholyte.

EXAMPLE 1

Production of L-cysteine from L-cystine

Cell design: The cell comprised a catholyte chamber and a gas chamber and, there, between, a GDE with a cation-exchange layer. The round cell used had a GDE surface area A of 19.6 cm². The hydrogen-consuming anode consisted of a hydrophilic graphite fleece (cloth A, E-Tek Company) on which the catalyst (10% Pt on Vulcan XC-72, E-Tek company) mixed with PTFE suspension HOSTAFLON®, 60% in water (Hoechst Company) was applied. A solution of 20% by weight NAFION® (DuPont) in alcohol with a charge of approximately 0.3 g/cm² was poured onto the catalytic layer. The composite was subsequently dried at a temperature of 100° C. The finished GDE with membrane layer was contacted on the fleece side with a Pt net and graphite particles with a diameter of 3–4 mm (Conradty Company) were placed onto the Pt net. A second Pt net was put over that which net transferred the current onto the anode segment. The cathode chamber filled with graphite particles, d=3–4 mm (Conradty Company) as the electrode was located on the opposite side of the membrane. The fixed-bed electrode was contacted by a conductive contact plate. The thickness of the anodic fixed bed was approximately 9 mm; the thickness of the cathodic fixed bed was approximately 16 mm.

Test procedure: The aqueous solution was placed into a circulating vessel. The solution (volume: 250 ml) contained 132 g/l cystine, 85 g/l NaOH. The solution was transported into the cell with a circulating pump. From the cell the solution passed back into the circulating vessel. Specimens were drawn out of the circulating vessel which were analyzed with HPLC. The cell was operated galvanostatically via a rectifier. The terminal voltage (potential difference) was recorded. Table 1 shows the voltage and the current as well as the measured concentration of cystine and cysteine.

TABLE 1

| Duration (h:min) | Current (A) | Voltage (V) | Concentrated cystine (g/l) | Concentrated cysteine (g/l) |
| --- | --- | --- | --- | --- |
| 0 | 0.5 | 1.32 | 131 | — |
| 1:10 | 2.0 | 2.49 | 109 | 44 |
| 1:30 | 1.5 | 1.97 | 103 | 55 |
| 3:10 | 1.5 | 2.5 | 62 | 86 |
| 6:55 | 1.0 | 2.5 | 32 | 131 |
| 7:25 | 1.0 | 2.44 | — | 133 |

The current yield was 76%; the conversion was 100%; the time yield of the membrane surface was 2.3 kg/(h*m²); the specific energy requirement was 0.79 kWh/kg.

EXAMPLE 2

Production of N-acetyl-L-cysteine (AcCys) from NN'-diacetyl-L-cystine (Ac₂Cyss)

The cell design corresponded to that of Example 1 with the exception that in order to form the ion-exchange layer the NAFION® solution (20% by weight) was applied in an amount of 0.3 g/cm² and, immediately thereafter, a 20 μm thick, polymeric ion-exchange film (e.g., from the Gore Company) was applied. The film adhered to the not yet dry layer. The composite was subsequently dried at a temperature of 100° C.

The test procedure corresponded to Example 1. An aqueous solution was used similar to the one obtained in the acetylization according to Schotten-Baumann using acetic anhydride and adjusting the pH to approximately 7 with a content of 254 g/l NN'-diacetyl-L-cystine (Ac₂Cyss), 145 g/l sodium acetate. Table 2 shows the test parameters.

TABLE 2

| Duration (h:min) | Current (A) | Voltage (V) | Ac₂Cyss (g/l) | AcCys (g/l) | pH |
| --- | --- | --- | --- | --- | --- |
| 0 | 0.5 | 3.6 | 254 | — | 6.7 |
| 2:40 | 1.0 | 4.2 | 200 | 53 | 7.3 |
| 4:40 | 1.0 | 4.3 | 140 | 100 | 7.7 |
| 6:50 | 1.0 | 4.4 | 80 | 151 | 7.4 |
| 8:10 | 1.0 | 4.4 | 57.4 | 171 | 6.7 |
| 10:10 | 1.0 | 4.4 | 27.2 | 206 | 7.0 |
| 12:10 | 1.0 | 4.4 | 15.6 | 212 | 7.5 |

The current density was 51 mA/cm², the current yield 60%, the conversion 94%, the yield of AcCys 84%, the time yield of the membrane surface was 1.8 kg/(h*m²), the specific energy requirement was 1.2 kWh/kg.

EXAMPLE 3

In the method for the electrochemical cleaning of chlorine gas according to EP 0,800,853 A the NAFION® membrane on the hydrogen-consuming anode was replaced by a NAFION® layer in accordance with the invention, applied according to Example 1. The waste gas to be cleaned contained 0.1% by volume chlorine. 0.5 M hydrochloric acid, which trickled over the cathodic fixed bed, served as catholyte.

Voltage: 2.56 V, current 10 A, surface area A=0.0252 m², bed depth=6 cm, gas throughput 300 I, trickling density 8 m³/(m²*h), degradation of chlorine=100%. Tests were carried out continuously with the same composite over a period of 4 weeks without any reduction of the cleaning performance occurring or the current consumption rising.

COMPARATIVE EXAMPLE 1 (VB 1)

A GDE pressed with a membrane (NAFION® 117) was used in a round cell (surface area A=19.6 cm²) for converting cysteine from cystine. An anodic fixed bed was used, as in Example 1.
Test results:
Voltage: 2.5 V; current density: 100 mA/cm²; current yield: 10%; conversion: 10%

It was recognized at the end of the test, after disassembly, that the composite had been damaged. Crystals had formed between the NAFION® membrane and the GDE.

COMPARATIVE EXAMPLE 2

Tests were carried out with a "pressed" unit of NAFION® 117 membrane and GDE as described in Example 3.

Voltage: 5.21 V, current 10 A, surface area A=0.0252 m², bed depth=6 cm, gas throughput 300 I, trickling density 8 m³/(m²*h), degradation of chlorine=100%, testing time approximately 8 h, residence time. After 8 hours the cell was disassembled since the voltage and the degradation of chlorine were constantly becoming worse. The NAFION® membrane had separated from the GDE.

What is claimed is:

1. An electrolysis cell for carrying out chemical reactions, comprising:
   an electrolyte chamber filled with electrically conductive filling material for receiving a liquid electrolyte,
   a gas chamber filled with electrically conductive filling material for receiving a gas to be oxidized or reduced,
   a gas diffusion electrode arranged between the gas chamber and the electrolyte chamber, wherein said gas diffusion electrode is connected on the electrolyte chamber side to an ion-exchanging separator, current collectors for the gas diffusion electrode and the filling material which act as a counterelectrode in the electrolyte chamber, and devices for supplying and removing the electrolyte and the gas, wherein the ion-exchanging separator is applied onto the gas diffusion electrode by a method comprising single or multiple applications of a solution of an ion-exchanging material in a solvent onto an electrocatalytically active layer of the gas diffusion electrode and at least partial evaporation of the solvent after each coating.

2. The electrolysis cell according to claim 1, wherein the gas diffusion electrode comprises a hydrogen-consuming anode or oxygen-consuming cathode and the ion-exchanging layer exchanges cations in the case of a gas diffusion anode and exchanges anions in the case of a gas diffusion cathodes.

3. The electrolysis cell according to claim 2, wherein an ion-exchange membrane is disposed on the ion-exchanging layer and is applied by layering, which ion exchange membrane comprises material that functions as an ion-exchanging layer.

4. The electrolysis cell according to claim 1, wherein the gas chamber and the electrolyte chamber contain graphite particles as filling material.

5. The electrolysis cell according to claim 1, wherein the gas diffusion electrode comprises a hydrogen-consuming gas diffusion electrode and wherein the ion-exchanging separator comprises a cation-exchange layer based on a fluoropolymer or fluorocopolymer containing sulfonic-acid groups.

6. The electrolysis cell according to claim 1, wherein the current collectors are formed on a rear wall of the gas chamber and on a rear wall of the electrolyte chamber and comprise corrosion-resistant metallic nets or metallic plates.

7. The electrolysis cell according to claim 1, wherein the electrolyte chamber contains devices for supplying and removing a gas containing a component to be reduced or oxidized in addition to the devices for supplying and removing the liquid electrolyte, and the arrangement of the devices for supplying and removing the electrolyte and the gas enable operation of the electrolyte chamber filled with filling material as a trickle-bed reactor.

* * * * *

UNITED STATES PATENT AND TRADEMARK OFFICE
CERTIFICATE OF CORRECTION

PATENT NO. : 6,217,728 B1  
DATED : April 17, 2001  
INVENTOR(S) : Lehmann et al.

Page 1 of 1

It is certified that error appears in the above-identified patent and that said Letters Patent is hereby corrected as shown below:

Title page,
The filing date should read September 24, 1999 instead of [October 5, 1999].

Signed and Sealed this

Twenty-second Day of January, 2002

Attest:

Attesting Officer

JAMES E. ROGAN
Director of the United States Patent and Trademark Office